US006941520B1

(12) United States Patent
Lewallen

(10) Patent No.: US 6,941,520 B1
(45) Date of Patent: Sep. 6, 2005

(54) METHOD, SYSTEM, AND PROGRAM FOR USING A USER INTERFACE PROGRAM TO GENERATE A USER INTERFACE FOR AN APPLICATION PROGRAM

(75) Inventor: Stephen Richard Lewallen, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/567,835

(22) Filed: May 9, 2000

(51) Int. Cl.[7] .......................... G06F 3/00; G06F 15/00; G06F 15/163
(52) U.S. Cl. ...................... 715/762; 715/744; 715/765; 715/866; 715/746; 709/220; 717/114; 717/116; 719/328
(58) Field of Search ................................. 345/744, 746, 345/733, 738, 762, 764, 765, 866; 709/201, 709/217–220, 230, 231, 238, 328, 331; 717/100, 717/104, 106–109, 114, 116, 118; 715/733, 715/738, 744, 746, 762, 764, 765, 866

(56) References Cited

U.S. PATENT DOCUMENTS

| | | | | |
|---|---|---|---|---|
| 5,774,720 A | * | 6/1998 | Borgendale et al. | 709/329 |
| 6,016,392 A | | 1/2000 | Jordan | 709/328 |
| 6,044,218 A | * | 3/2000 | Faustini | 717/107 |
| 6,185,590 B1 | * | 2/2001 | Klein | 715/526 |
| 6,496,202 B1 | * | 12/2002 | Prinzing | 345/762 |
| 6,496,865 B1 | * | 12/2002 | Sumsion et al. | 709/229 |

FOREIGN PATENT DOCUMENTS

| WO | WO 98/18079 | * | 4/1998 | G06F 13/10 |
|---|---|---|---|---|
| WO | WO 99/09474 | * | 2/1999 | G06F 9/455 |

OTHER PUBLICATIONS

Lauren Wood, "Programming The Web: The W3C DOM Specification," Jan.-Feb. 1999, Internet Computing, IEEE, vol. 3, issue 1, pp. 48-54.*
Jason Levitt, "Netscape's Challenge—Browser Beta Features Consistent Cross-Platform Rendering," Apr. 10, 2000, InformationWeek.*
U.S. Appl. No. 09/568,873, filed May 9, 2000, entitled "Method, System, and Program for Mapping Standard Application Program Interfaces (APIs) to User Interface APIs".
U.S. Appl. No. 09/567,836, filed May 9, 2000, entitled "Method, System, and Program for Mapping Objects in Different Language Formats".

(Continued)

Primary Examiner—X. L. Bautista
(74) Attorney, Agent, or Firm—David W. Victor; Konrad Raynes & Victor LLP

(57) ABSTRACT

Disclosed is a system, method, and program for generating a user interface for an application program. A determination is made of application program interfaces (APIs) in an application program that are members of a set of standard API interfaces. The application program further includes code in a computer language to perform application program operations. A determination is made from a mapping of at least one user interface API corresponding to the determined standard API interface. The user interface APIs are capable of controlling a user interface program to perform user interface operations. The standard APIs in the application program are converted to user interface APIs to generate the user interface for the application program. The code in the computer language is converted to executable code to perform the application program operations.

24 Claims, 4 Drawing Sheets

OTHER PUBLICATIONS

Microsoft Corporation, "The Component Object Model Specification", Version 0.9, Oct. 24, 1995.

J. Robie, "What is the Document Object Model?", Texcel Research, REC-DOM-Level-1-19981001, pp. 1-5, [retrieved on Feb. 7, 2001]. Retrieved from the Internet <URL: http://www.w3.org/TR/REC-DOM-Level-1/introduction.html>.

C. Verbowski, "Integrating Java and COM", Microsoft, Corporation, Jan. 1999, pp. 1-10.

Microsoft Corp., "Document Object Model Overview", copyright 2000, pp. 1-10, [retrieved on Feb. 6, 2001]. Retrieved from the Internet <URL: http://www.microsoft.com>.

IBM Corp., "SOMobjects", referring to The System Object Model (SOM) and the Component Object Model (COM), Jul. 7, 1994, pp. 1-5 [originally retrieved on Feb. 6, 2000, this copy retrieved on Sep. 14, 2001]. Retrieved from the Internet <URL: http://www-4.ibm.com/software/ad/som/library/somvscom.html>.

"QueryInterface", pp. 1-5, [retrieved on May 1, 2001]. Retrieved from the Internet.

"Interface Attributes", pp. 1-2, [retrieved on May 1, 2001]. Retrieved from the Internet.

C. Verbowski, "Using COM Objects from Java", Microsoft, Corporation, Feb. 1999, pp. 1-34.

Microsoft Corp., "The Component Object Model: A Technical Overview", copyright 2000, pp. 1-20, [retrieved on Feb. 6, 2001]. Retrieved from the Internet <URL: http://msdn.microsoft.com/library/techart/msdn_comppr.htm.

I. Kushnirskiy, "Java-to-XPCOM Bridge", Sep. 18, 2000, pp. 1-2, [retrieved on Feb. 7, 2001]. Retrieved from the Internet <URL: http://www.mozilla.org/projects/blackwood/connect/>.

* cited by examiner

METHOD, SYSTEM, AND PROGRAM FOR USING A USER INTERFACE PROGRAM TO GENERATE A USER INTERFACE FOR AN APPLICATION PROGRAM

CROSS-REFERENCE TO RELATED APPLICATIONS

This application is related to the following co-pending and commonly-assigned patent applications, all of which are filed on the same date herewith, and all of which are incorporated herein by reference in their entirety:

"Method, System, And Program For Mapping Objects in Different Language Formats" to Stephen R. Lewallen, having U.S. application No. 09/567,836; and "Method, System, And Program For Mapping Standard Application Program Interfaces (Apis) to User Interface Apis" to Stephen R. Lewallen, having U.S. application No. 09/568,873.

BACKGROUND OF THE INVENTION

1. Field of the Invention

Preferred embodiments provide a method, system, and program for generating a user interface for an application program and, in particular, using a user interface program to generate the user interface for the application program.

2. Description of the Related Art

One of the purposes of the Java programming language is to allow programmers to develop applications that can execute across operating system platforms. The Java language accomplishes the cross-platform implementation by providing an added layer of execution between the underlying operating system and programs written in the Java computer language. The Java Platform converts Java source code (.Java files) to bytecodes (.class files), which are machine independent representations of a Java class. Thus, the same bytecodes would be created for all operating system platforms. The bytecodes are then inputted to a Java Virtual Machine program that converts the byte codes to the object code in the native machine language of the operating system on which the Java Virtual Machine is installed. There is a platform-specific Java Virtual Machine program for each platform on which Java programs can execute.  Java and JDBC are trademarks of Sun Microsystems, Inc.; Microsoft is a registered trademark of Microsoft Corporation; OS/2 is a registered trademark of International Business Machines Corporation; Netscape is a registered trademark and Netscape Communicator, Netscape Navigator, Mozilla are trademarks of Netscape Communications Corporation.

All Java programs utilize Java specific toolkits to implement a graphical user interface for Java, which is based on the Java look-and-feel. The purported goal of the Java look-and-feel is to provide a distinctive platform-independent appearance and standard behavior. To implement the Java look-and-feel, Sun Microsystems, Inc. provides the Abstract Window Toolkit (AWT) and Swing components which are classes that implement a Java graphical user interface (GUI). One drawback to implementing the GUI in the Java look-and-feel is that the Java look-and-feel is significantly different from the look-and-feel implemented in the native operating system, such as Windows, OS/2, etc. Thus, users running a Java program on a particular operating system platform will have to use the Java GUI interface which differs from the operating system GUI interface to which they are accustomed. These differences can discourage users from adopting Java applications, especially when other application programs, such as those implemented in C++, all use the same native API function calls to implement the native operating system GUI components. Sun Microsystems, Inc. addresses this problem by continually trying to incorporate elements of common operating system platforms into the Java look-and-feel. However, this approach consistently leaves the Java look-and-feel a step behind what is currently implemented in the operating system platform.  Java and JDBC are trademarks of Sun Microsystems, Inc.; Microsoft is a registered trademark of Microsoft Corporation; OS/2 is a registered trademark of International Business Machines Corporation; Netscape is a registered trademark and Netscape Communicator, Netscape Navigator, Mozilla are trademarks of Netscape Communications Corporation.

Another drawback with the Java GUI interface is that the Java interface must be converted to Java bytecodes and then to native operating system commands using the Java Virtual Machine layer. This extra layer of compilation for the user interface slows down the execution of Java programs on the native operating system. Non-java programs that use the native operating system API function calls to implement the GUI do not have this problem as they directly call the native operating system API functions that implement the GUI and do not need an additional layer of conversion as in the case of Java.

Another drawback with Java is that Java application programs, including Java Applets that often execute within a Java enabled HTML web browser, are confined to executing within the Java area of execution. An executing Java program cannot interact with other components and objects in the operating system. For instance, a Java applet executing within a web browser cannot access tables and data outside of the area of execution of the applet, even if such tables are in the HTML document displayed in the web browser.

To address this problem, Microsoft has provided a mechanism to allow Java applications to access the Microsoft operating system component objects, referred to as COM objects. COM objects are used to store reusable software components. A component is a reusable piece of software in binary form that can easily interface with components from different vendors. For example, a spell checking component can be used with word processing programs from different programs.

Component objects are accessed through interfaces. An interface is a strongly-typed group of semantically-related functions, also called "interface member functions." The interface is defined according to its use and behavior. A client system or process calls the interface to access the implementation of an object and requests the object's services. The interface includes member functions that act upon the object. The client maintains a pointer to the interface which is, in actuality, a pointer to an array of pointers to the object's implementations of the interface member functions.

When calling member functions, the caller would construct a COM API (application program interface) with an argument which is the pointer to the object instance itself. The interface would then access the code in the object to carry out a particular operation or set of operations. Further details of the Microsoft Corporation implementation of COM is described in the publication "The Component Object Model Specification, Draft Version 0.9" (Copyright 1992–95 Microsoft Corporation), which publication is incorporated herein by reference in its entirety.

Microsoft Corporation currently provides an architecture to make Windows COM objects available to Java programs.

The Microsoft Java Virtual Machine (VM) internally uses a Java-Callable Wrapper (JCW) to represent a COM object in Java. JCWs appear to Java developers as generic Java objects. JCWs are programmatically manipulated in exactly the same way as any regular Java object. The JCW contains all the information necessary for the Microsoft VM to manipulate the underlying COM object. COM objects can be used in the same manner as Java objects because the Microsoft VM exposes COM objects as Java objects. Microsoft further provides J/Direct to access Windows API COM functions to create new instances of COM classes. J/Direct provides classes that map COM functions to Java calls. Further details of how Microsoft provides Java applications access to COM objects are described in the publications "Using COM Objects from Java," by Chad Verbowski (Copyright Microsoft January 1999) and "Integrating Java and Com", by Chad Verbowski (Copyright Microsoft, January 1999), which publications are incorporated herein by reference in their entirety.

By using J/Direct to expose COM objects to Java applications, J/Direct allows the Java application to access objects outside of the area of execution of the Java application. However, Microsoft's J/Direct system is limited to the Microsoft operating systems and Microsoft Java Virtual Machine. Microsoft's proprietary approach defeats the Java goal of allowing the application program to execute across different operating system platforms. A Java developer who writes a Java application using the J/Direct interfaces to COM objects is limited to the Microsoft Windows platform and cannot access the COM version of objects in other operating systems, thus defeating the cross-platform goal of Java.

Thus, there is a need in the art for an improved platform independent technology to allow Java applications to access operating system components and objects outside of the area of execution of the Java program for the purpose of generating the user interface for the Java application.

There is also a need in the art to allow Java applications to use more commonly used graphical user interface (GUI) components, other than the GUI components offered in Java tool kits, such as AWT.

SUMMARY OF THE PREFERRED EMBODIMENTS

To overcome the limitations in the prior art described above, preferred embodiments disclose a method, system, and program for generating a user interface for an application program. A determination is made of application program interfaces (APIs) in an application program that are members of a set of standard API interfaces. The application program further includes code in a computer language to perform application program operations. A determination is made from a mapping of at least one user interface API corresponding to the determined standard API interface. The user interface APIs are capable of controlling a user interface program to perform user interface operations. The standard APIs in the application program are converted to user interface APIs to generate the user interface for the application program. The code in the computer language is converted to executable code to perform the application program operations.

In further embodiments, the computer language and user interface program are capable of executing on multiple operating system platforms to allow the application program to include standard API interfaces to execute on the multiple operating system platforms via the user interface program.

In still further embodiments, the computer language comprises a cross-platform object oriented computer language including Java and the user interface program comprises a web browser program.

Preferred embodiments make available standard API interfaces, such as those specified in the W3C DOM specifications, for use with programs written in cross-platform languages, such as Java, to allow the application program to manipulate objects and interfaces in a user interface program, such as a Mozilla browser or Internet Explorer, that implements the standard API interfaces. This extends the Java environment by making any object accessible to the user interface program accessible to the Java application program. The preferred embodiments take advantage of the fact that many user interface programs, such as the common web browsers, implement the W3C DOM specification and API interfaces. By providing a mapping of the W3C interfaces to the specific user interface implementation, the preferred embodiments allow Java developers to utilize W3C standard interfaces to access objects in the user interface program to allow the Java program to use the user interface.

By making user interface objects accessible to the Java program, the Java program can implement its user interface using the interface component objects of the user interface program. This allows a Java program user interface to have the same "look-and-feel" as the user interface program, e.g., Internet web browser, as the Java program is ultimately using the same user interface component objects utilized by the user interface program. Because the translator programs of the preferred embodiments allow the Java application program and standard API interfaces to execute across different operating system platforms, preferred embodiments provide a mechanism for a Java program to access and manipulate user interface and operating system objects across operating system platforms

BRIEF DESCRIPTION OF THE DRAWINGS

Referring now to the drawings in which like reference numbers represent corresponding parts throughout.

DETAILED DESCRIPTION OF THE PREFERRED EMBODIMENTS

In the following description, reference is made to the accompanying drawings which form a part hereof, and which illustrate several embodiments of the present invention. It is understood that other embodiments may be utilized and structural and operational changes may be made without departing from the scope of the present invention.

Figure 1:
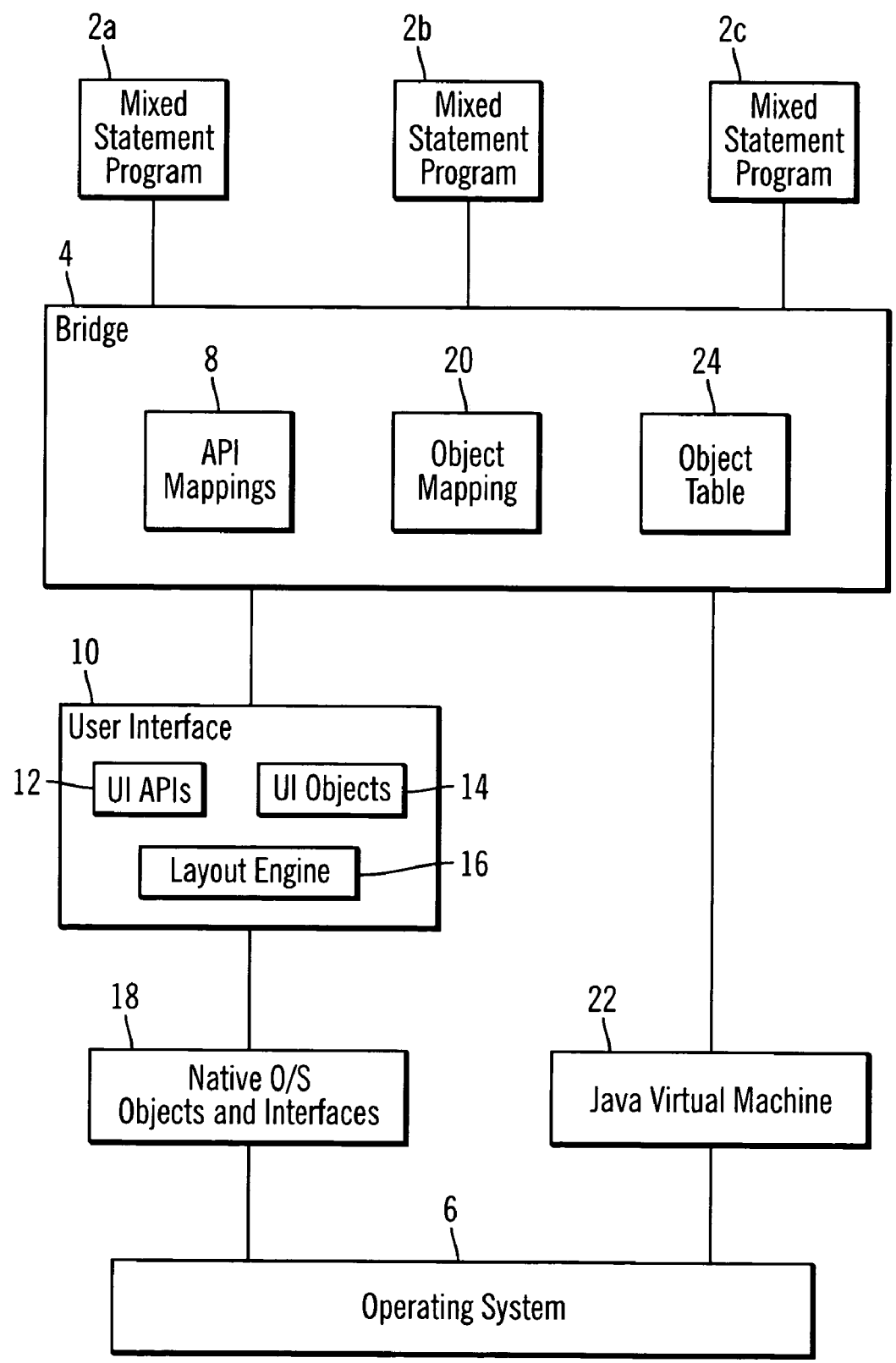
FIG. 1 illustrates elements of the computer architecture in which preferred embodiments are implemented.

FIG. 1 illustrates the components of the computer architecture in which preferred embodiments are implemented. Mixed statement programs 2a, b, c, comprise programs written in the Java programming language, or any other cross-platform language, that may include the standard API interfaces developed by the World Wide Web Consortium (W3C) for the Document Object Model (DOM) application programming interface (API). Thus, these programs 2a, b, c include language statements from different programming languages or protocols, such as Java and non-Java standard API interfaces, such as the W3C API interfaces.

The DOM model is a standard interface used to define the structure of documents, particularly HTML and XML documents. In the DOM specification, the term "document" is used in the broad sense to include the components of a textual document as well as components of an application program. The DOM interface represents the document or application program as a hierarchical arrangement of nodes. All the components of an HTML or XML document, including data as well as program elements, such as the user interface elements, can be expressed as hierarchically arranged nodes. The W3C DOM specifications provide API interfaces to access, change, delete or add nodes to the DOM representation of a document, or application program. The API interfaces specified in the DOM specifications are referred to herein as "W3C API interfaces."

In preferred embodiments, the mixed statement programs 2a, b, c may incorporate the W3C API interfaces of DOM specifications, such as the DOM level 1 Core, including DOM Level 1 HTML, which provides W3C interfaces representing all of the HTML 4.0 elements, DOM Level 2 Core which comprises modifications to DOM Level 1, DOM Level 2 Cascading Style Sheets, etc. Many browsers such as Microsoft Internet Explorer version 5 and Mozilla based browsers, such as Netscape Communicator, implement the W3C DOM Level 1 HTML interface, as well as Cascading Style Sheets. In this way, developers creating mixed statement programs 2a, b, c may utilize the W3C API interfaces as specified in the W3C specifications, such as the "Document Object Model (DOM) Level 1 Specification, Version 1.0" (Oct. 1, 1999) and "Document Object Model (DOM) Level 2 Specification, Version 1.0" (Dec. 10, 1999), which are incorporated herein by reference in their entirety, and which include the DOM Level 1 HTML, DOM Level 2 Core, DOM Level 2 CSS, DOM Level 2 Views and Events, DOM Level 2 HTML, DOM Level 2 Stylesheets, DOM Level 2 CSS, DOM Level 2 Traversal, etc.

After the mixed statement programs 2a, b, c are written to include Java programming language statements as well as W3C API interface calls, the mixed statement program 2a, b, c is processed by a bridge 4. The bridge 4 maintains an API mapping 8 of W3C API interfaces to the corresponding implementation of the W3C API interface in a user interface (UI) program 10 that implements the DOM, such as Internet Explorer, Netscape Communicator and Navigator, Mozilla, the Scalable Vector Graphics format used by Adobe Systems, Inc., or any other user interface that implements the DOM.

The user interface program 10 includes user interface (UI) APIs 12 that are used to manipulate user interface (UI) objects 14 that implement the elements and components of the observable user interface features produced by the user interface program 10. A user interface layout engine 16 would transform the UI APIs 12 and UI objects 14 to the native operating system objects and interfaces 18 on which the browser layout engine 16 was written to operate. For instance, Internet browsers, such as Internet Explorer and Netscape Navigator, include different layout engines for different operating systems to transform the user interface APIs 12 and objects 14 to native operating systems objects and interfaces 18. The browser layout engine has all the mappings to access and control the native operating system. The Mozilla browser layout engine, referred to as the Next Generation Layout (NGLayout) or Gecko layout engine, processes the API functions that implement the W3C DOM Level 0, Level 1, and Level 1 HTML, as well as cascading style sheets and other DOM standards, and generates the native operating system calls to execute the requested operation.

The bridge 4 API mapping 8 would include for each supported W3C API interface, the corresponding UI API 12 interface in the user interface program 10. In preferred embodiments, the API mapping 8 would map the Java class names to the unique identifiers of the user interface APIs 12. The user interface APIs 12 would in turn manipulate browser objects, such as browser COM objects.

The bridge 4 further includes an object mapping 20 of Java objects, that may be called from within the mixed statement programs 2a, b, c. The mixed statement programs 2a, b, c would include a W3C API interface call to a Java object, which maps to a corresponding UI COM object 14 in the user interface 10. The mixed statement programs 2a, b, c may include W3C API calls instantiating and manipulating Java objects, that map to UI objects 14 in the user interface 10. For instance, the object mapping 10 for Internet Explorer describes the mapping of Java objects to COM objects, whereas for Mozilla based browsers the mapping 10 is to XPCOM objects in the Mozilla browser. The bridge 4 uses the API 8 and object 20 mappings to transform W3C API interfaces in the mixed statement programs 2a, b, c to the corresponding user interface APIs 12 and objects 14 that can be executed directly by the user interface layout engine 16, which would then access the underlying operating system interfaces and objects 18 to execute the action. The bridge 4 will forward Java language statements to a Java Virtual Machine (JVM) 22 to process. Thus, in preferred embodiments, the bridge 4 separately processes the Java language statements to generate bytecodes executable by the native operating system and separately processes the W3C API interfaces to produce language statements and object code that the user interface 10 can directly execute.

The W3C API interfaces include numerous methods to implement objects in the user interface 10. By exposing a Java program, or mixed statement programs 2a, b, c, to the W3C API interfaces, a mixed statement program 2a, b, c including Java program statements can access any user interface feature and object that the user interface program 10 is capable of implementing. Thus, with the preferred computer architecture, the Java program is no longer constrained to the Java programming space, and may extend the Java program to other objects and programs available in commonly used user interface programs. For instance, the mixed statement programs 2a, b, c may include the W3C HTML API interfaces to implement a user interface using the underlying UI objects 14 supported in the user interface 10. With this approach, the mixed statement programs 2a, b, c can generate a user interface that has the same look-and-feel as the commonly used user interface 10 with which the user is intimately familiar.

Because the bridge 4 maps to user interface APIs 12, the mixed statement programs 2a, b, c may execute on any operating system on which the user interface 10 may execute. The user interface layout engine 16 will handle the conversion of the browser APIs 12 and objects 14 to the specific operating system 6 platform.

Figure 2:
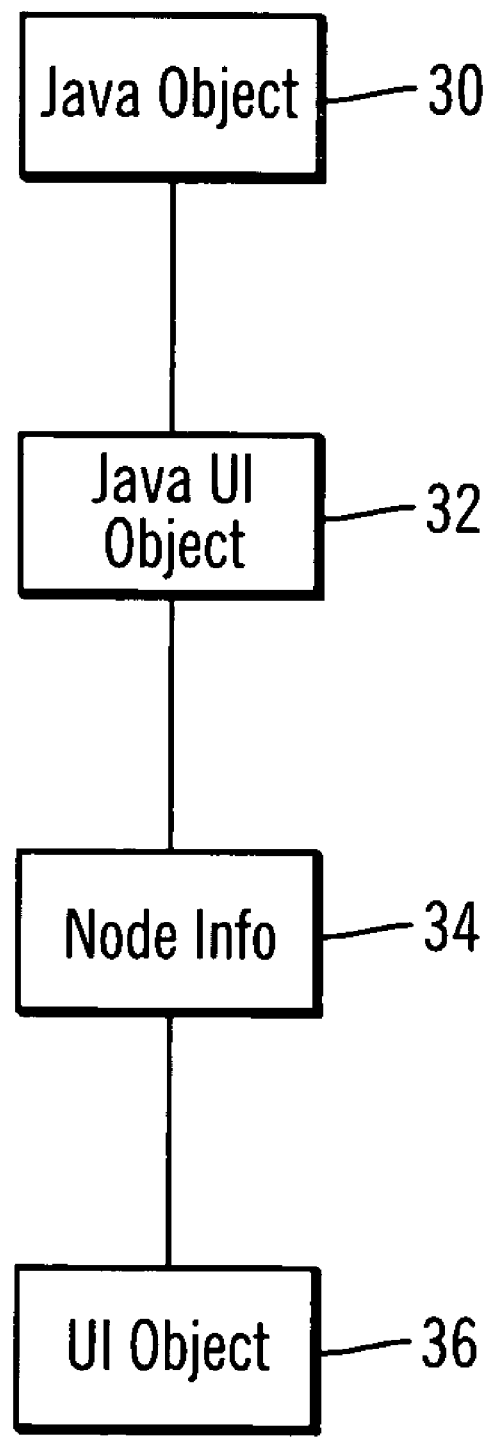
FIG. 2 illustrates data structures used to link a Java object to a user interface object in accordance with preferred embodiments of the present invention.

As discussed the object mapping 20 exposes user interface objects 14 to the mixed statement programs 2a, b, c to provide Java applications access to the user interface 10 functions and elements. The object mapping 20 provides a linkage of an instance of a user interface object 14, e.g., COM object, XPCOM object, etc., to a corresponding Java object that may be manipulated by the mixed statement program 2a, b, c. When a W3C API interface is used in a mixed statement program 2a, b, c to instantiate an instance of a Java object that corresponds to a native operating system object, the Bridge 4 would generate the Java native object 32 and node info object 34 data structures illustrated in FIG. 2 to provide a linkage between the Java object 30 and the corresponding user interface (UI) object 36. The node info object 34 comprises a pointer to the instantiated UI object 36. The Java native object 32 has a pointer to the node info object 34. The Java object 30 inherits all the properties of the Java native object class and can access all the functions implemented in the Java native object class. In this way, the Java object 30 is bound to the corresponding UI object 36 through the Java native object 32 and the methods that allow the Java object 30 to access the node info object 34, which can then be used to access the UI object 36.

In preferred embodiments, the bridge 4 maintains an object table 24 (FIG. 1), which includes the value of the pointer for any native operating system object, e.g., COM object, linked to a Java object. The bridge 4 uses the object table 24 to avoid creating multiple instances of the same Java object. If a pointer to a user interface object is listed in the table 24, then the bridge 4 will have the API function calling such object use the already existing instance of the object instead of instantiating an additional instance of the same object.

Figure 3A:
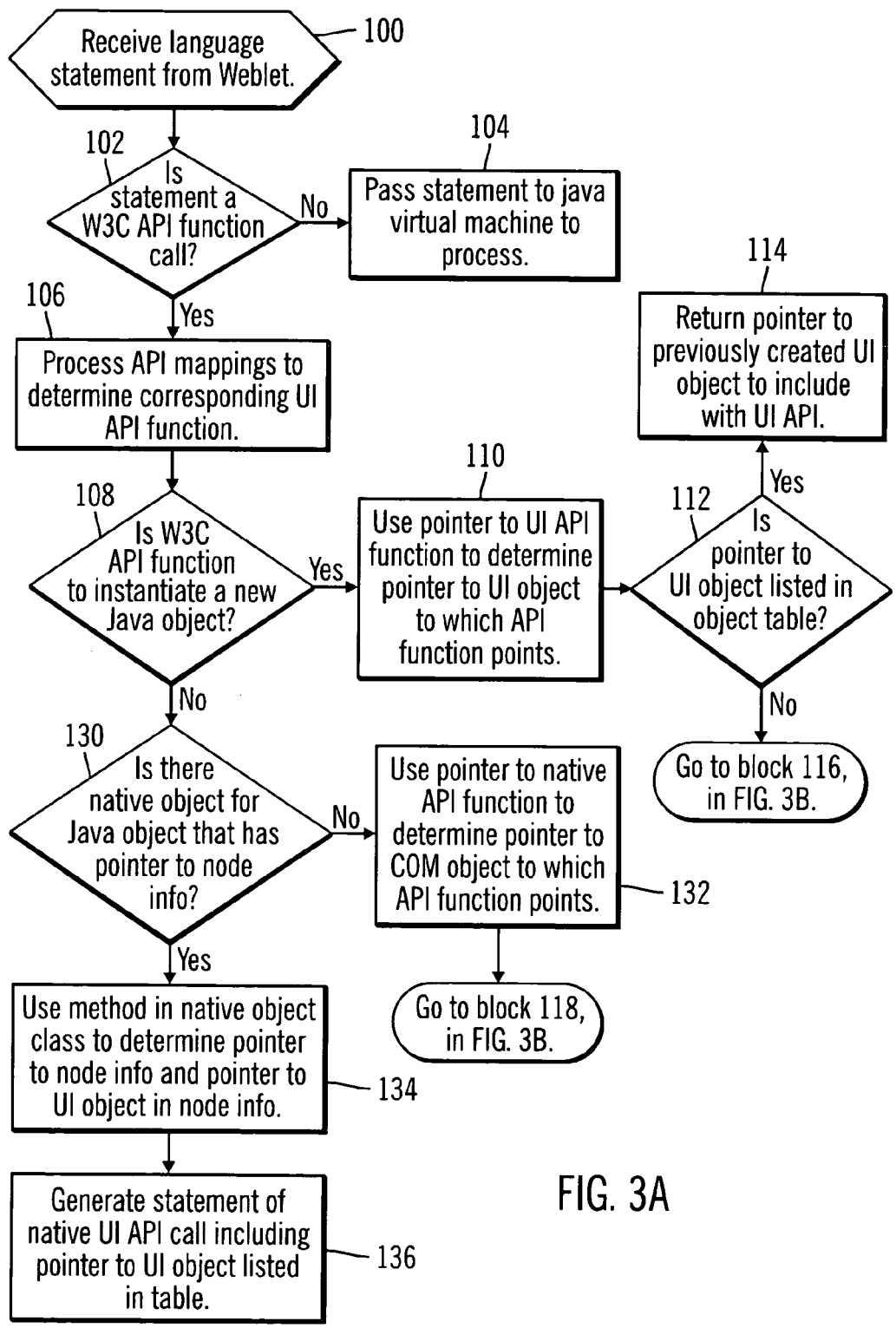
FIGS. 3a, b illustrate logic to transform Java program language statements to code that can be directly executed by the native operating system in accordance with preferred embodiments of the present invention.

FIGS. 3a, b illustrate logic implemented in the bridge 4 to process language statements in the mixed statement programs 2a, b, c. Control begins at block 100 with the bridge 4 receiving a language statement in one mixed statement program 2a, b, c. The bridge 4 determines (at block 102) whether the statement is a W3C API function call for which there is an API mapping 8. If not, then the bridge 4 passes (at block 104) the statement to the Java virtual machine 22 to transform to native machine code, i.e., bytecodes. Otherwise, the bridge 4 processes (at block 106) the API mappings 8 to determine the corresponding user interface API 12 function call, which may comprise the GUID of the API function call. If the UI API 12 function is to instantiate a new UI object 14 (at block 108), then the bridge 4 uses (at block 110) the pointer to the API function call to determine the pointer to the UI 14 object in a manner known in the art. The bridge 4 then determines (at block 112) whether the pointer to the UI object 14 is listed in the object table 18. If so, the bridge 4 returns (at block 114) the pointer to the UI object 14 listed in the object table 18 to the user interface API 12 function, and then would proceed back to block 100 to process further statements in the mixed statement program 2a, b, c. This ensures that the bridge 4 would never create UI objects 14 for the same intended object in order to maintain the uniqueness of each UI object 14. Otherwise, if there is not a pointer to the UI object 14 listed in the object table 18, then control proceeds to block 116 in FIG. 3b to generate UI APIs 12 and the accompanying linkage data structures from the corresponding Java object 30 to a new UI object 36.

Figure 3B:
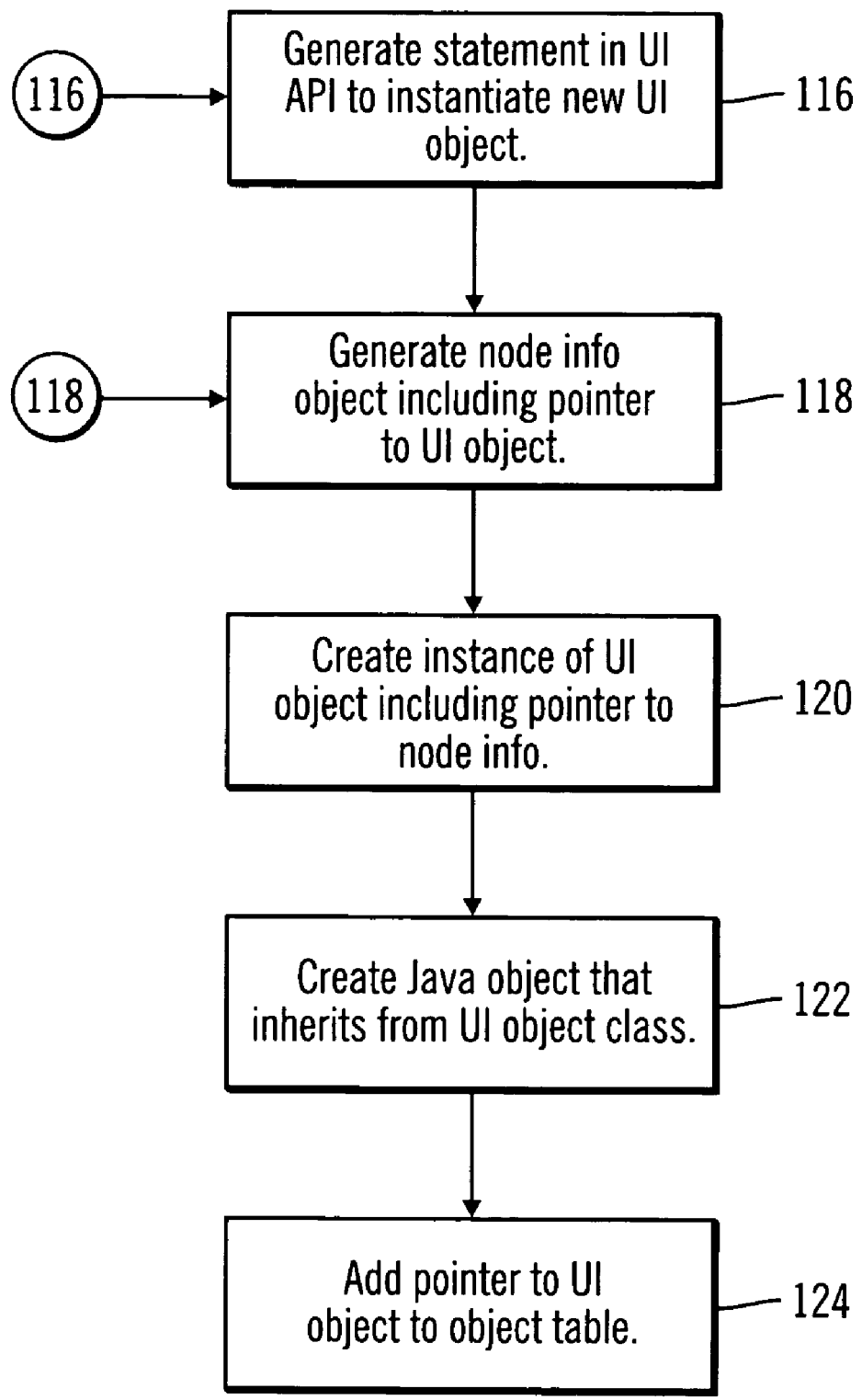

At block 116 in FIG. 3b, the bridge 4 generates the UI API function 12 to create a new instance of the UI object 14. The bridge 4 then creates (at block 118) a node info object 34 that includes a pointer to the instantiated UI object 36. A Java user interface (UI) object 32 is created (at block 120) to implement the Java UI object class and includes a pointer to the node info object 34. The Java object specified in the W3C API function instantiating the Java object is then created and defined (at block 122) to inherit from the Java UI object class. In this way, an instance of the Java object and instances of the Java UI object 32 and node info object 34 are created to provide linkage from the Java object 30 to the corresponding UI object 36. The pointer to the new UI object 36 is then added (at block 124) to the object table 24 to ensure that additional instances of the same UI object are not created. From block 124, control would transfer back to block 100 to process any further statements in the mixed statement program 2a, b, c.

If, at block 108 in FIG. 3a, the bridge 4 determines that the W3C API function call is not to instantiate a new Java object, then the bridge 4 further determines (at block 130) whether there is a Java UI object 32 for the Java object 30 that includes a pointer to a node info object 34. If a Java UI object 32 has not yet been created for the Java object 30, then the bridge 4 uses the pointer to the UI API function 12 determined from the API mappings 8 to determine (at block 132) the pointer to the UI object 14 to which the UI function interfaces. From block 132, control proceeds to block 118 in FIG. 3b to create the linkage data structures from the Java object 30 specified in the W3C API function call to the existing UI object 36.

If, at block 130, there is already a Java UI object 36 for the Java object 30 in the W3C API function call, then the bridge 4 uses (at block 134) a method in the Java UI object class to determine the pointer to the node info object 34 from the Java UI object 32 for the Java object 30 called in the W3C API function. The functions in the Java UI object class are also used to query the node info object 34 to determine the pointer to the UI object corresponding to the Java object. After obtaining the pointer to the UI object, the bridge 4 then constructs (at block 136) a statement comprising the determined user interface function call including the pointer to the UI object determined from the node info object 34, resulting in a user interface function call to a UI object.

In further embodiments, it is possible that multiple UI objects and interfaces are used to implement a single W3C class. In such case, the bridge 4 would create an additional data structure referred to as a proxy object to which the node info object points. This proxy object would in turn include pointers to multiple UI interfaces providing access to one or more UI objects that implement the W3C interface. In this way, the proxy object exposes the Java object and corresponding W3C API interface to one or more UI interfaces and objects. When processing calls to such a Java object, the bridge 4 would transform the call to the Java object to the multiple UI API interfaces specified in the proxy object to which the node info for the Java object points.

The result of the logic of FIGS. 3a, b is that the bridge transforms W3C API function calls added to mixed statement programs 2a, b, c to the implementation of those W3C calls in the user interface 10. Preferred embodiments exploit the fact that many current user interfaces, such as Mozilla browsers, Microsoft Internet Explorer version 5, Adobe Scalable Vector Graphics, etc., implement the W3C DOM interfaces. A program developer may then include W3C API calls in a mixed statement program also including Java language statements to directly access the user interface objects maintained in the operating system. Preferred embodiments thus allow Java developers to extend Java programs beyond the Java runtime environment and utilize existing structures and objects implemented in the operating system. This preferred embodiment computing architecture allows a Java program, such as an Applet, to be a full citizen of the operating system as the mixed statement program 2a, b, c can access any user interface program 10 interface and object defined in the operating system that implements a W3C API interface.

In preferred embodiments, the mixed statement programs may execute using multithreading techniques known in the art to concurrently execute multiple mixed statement programs in a single browser or web page.

Further, with the preferred embodiment architecture, the Java developer may expose data in any object accessible to the user interface, including DOM trees, to java tools. For instance, the mixed statement program may include Java Database Connectivity (JDBC) calls to perform queries to access data from a database. The program could then include W3C API interface calls to insert database records returned from the JDBC calls into the DOM for a displayed HTML page to display the returned data in the HTML page. Alternatively, the mixed statement program may call a Java Bean application to perform various calculations or operations on data, and then include W3C API interfaces to insert the results of the operation from the Java program in the HTML DOM to display in the web page.  Java and JDBC are trademarks of Sun Microsystems, Inc.; Microsoft is a registered trademark of Microsoft Corporation; OS/2 is a registered trademark of International Business Machines Corporation; Netscape is a registered trademark and Netscape Communicator, Netscape Navigator, Mozilla are trademarks of Netscape Communications Corporation.

The bridge 4 may be included in a Java Development Kit (JDK) or Java Runtime Environment (JRE) package for a specific operating system, e.g., Linux, Windows, OS/2, or any other supported operating system platform. The API mappings 8 would map each supported W3C API interface to the corresponding implementation of that interface in a user interface capable of executing on the specific operating system. In this way, the mixed statement program can execute on any operating system for which there is a version of the JDK or JRE including the bridge 4 and API mappings 8.

Using the W3C Interface to Manipulate the DOM

The above implementation concerned the general mapping of W3C API interfaces to user interface APIs 12 to manipulate the user interface objects 14 from a Java mixed statement program. Another aspect of the DOM is that it allows a document, or program or any component in the system to be expressed as a hierarchical relationship of objects that may separately be manipulated. Each element is maintained with attributes of the element. This allows a user to delete, add, or change an element, change its content or add, delete or change an attribute. For instance, the different parts of a document, such as sections, images, chapters, etc., may each be expressed as a DOM element in a hierarchical tree of DOM elements that define the entire document. Further, an HTML page may be expressed in a DOM tree where the elements of the HTML page, including user interface elements and program components, are expressed in a hierarchical relationship. The DOM makes all of the objects in a page, e.g., and HTML or XML page, such as images, forms, and even CSS properties, accessible to an application program. Various W3C API functions are available for manipulating DOM objects arranged in a hierarchical relationship. By manipulating particular DOM objects of an HTML page using W3C API interfaces or their corresponding implementation in a particular web browser or operating system, the user may specifically alter particular sections of the HTML page by manipulating the element(s) without affecting other sections of the HTML page defined in other elements.

Currently, the DOM is widely accepted as a standard for defining components within documents and applications, especially those related to the Internet, such as XML and HTML documents. In fact Microsoft Explorer 5.0 and Mozilla implement HTML using the DOM model and APIs. Further details of expressing document and application components in a DOM tree are described in the DOM specifications incorporated by reference above.

With the preferred embodiment bridge 4, a developer may use W3C API interfaces to implement the elements of a program or document, e.g., web browser, HTML page, user interface, etc., in a DOM tree and control the user interface through W3C API interfaces that manipulate the nodes of the DOM that implement the user interface. The W3C includes specific API interfaces to access, manipulate, create, modify and destroy node elements in a DOM tree. In such case, the API mappings 8 would include mappings for W3C API interfaces to access and manipulate nodes in a DOM tree to the corresponding command in the underlying browser or native operating system. In this way, the program developer may insert W3C API interfaces in a mixed statement program to manipulate a DOM implemented by the user interface program 10, which the bridge 4 would transform to API interfaces in the user interface program 10.

With the preferred embodiment architecture, the program developer can access the browser layout engine to generate the user interface for a program written in a different program language, such as Java. This allows the program developer to "draw" the user interface using use the HTML browser on the user's system to provide a user interface that has the same "look-and-feel" presented by the installed browser. Moreover, by using the APIs of the browser, the bridge 4 does not have to be capable of providing the transformation to native operating system machine code as all such transformations are handled by the web browser's layout engine. Such implementations of the bridge to interface with the browser engine frees the Java programmer from the Java "look-and-feel" and the limitations of the Java AWT and Swing kits. With preferred embodiments, the look-and-feel of the mixed statement program would have the same user interface and look-and-feel of the browser already installed on the user's system.

With the preferred embodiments, a program developer may write the user interface using the W3C API interfaces related to HTML and the program logic in Java. Using the W3C interfaces, the mixed statement program could include event listeners to modify the HTML page upon the occurrence of certain events such as user input. Another way to write the mixed statement program is to embed the program in an empty HTML page in a manner similar to a Java Applet. During runtime, the mixed statement program embedded in a Web page like an Applet may dynamically add buttons, tables, text and graphics to the HTML page by manipulating the HTML DOM. Still further, the mixed statement program may include a combination of preconstructed HTML elements for the user interface as well as adding elements by manipulating the DOM. Yet further, the program can be written to run as a standalone application, using the HTML elements to generate a separate GUI window, like any other operating system window. In such case, the mixed statement program may utilize the browsers engine to generate the user interface without necessarily having the look and feel of a typical HTML page, including the browser chrome.

In preferred implementations, the bridge 4 including its API mappings would be implemented in different packages to interface with different operating system platforms. Thus, the Bridge may be included in the JRE and JDK kits for each operating system platform that supports Java to map the W3C API interfaces to the native operating system API interfaces. Further, the bridge may be implemented in the Java code included with Java enabled browsers to map the W3C APIs to the API interfaces used by the browser engine. This would allow a user to download a mixed statement program through the web browser and execute the mixed statement program in the web browser. The executing mixed statement program, through the Bridge, would issue W3C API calls that are mapped to the corresponding browser implementation of those calls. The browser layout engine would then directly execute the mapped API calls to generate the user interface and manipulate components.

ALTERNATIVE EMBODIMENTS AND CONCLUSIONS

The following describes some alternative embodiments for accomplishing the present invention.

The preferred embodiments may be implemented as a method, apparatus or information bearing media using standard programming and/or engineering techniques to produce software, firmware, hardware, or any combination thereof. The programs defining the functions of the preferred embodiment can be delivered to a computer via a variety of information bearing media, which include, but are not limited to, computer-readable devices, carriers, or media, such as a magnetic storage media, "floppy disk," CD-ROM, a file server providing access to the programs via a network transmission line, wireless transmission media, signals propagating through space, radio waves, infrared signals, etc. Of course, those skilled in the art will recognize that many modifications may be made to this configuration without departing from the scope of the present invention. Such information bearing media, when carrying computer-readable instructions that direct the functions of the present invention, represent alternative embodiments of the present invention.

In preferred implementations, the W3C API interfaces are provided and mapped to corresponding API interfaces in the user interface in which the mixed statement program will execute. However, alternative embodiments may allow the use of standard API interfaces other than W3C. For instance, if another set of API interfaces, not those proposed by W3C, is adopted industry wide, then the Bridge may provide mappings from those alternative industry standard API interfaces to the implementation of those standard APIs in a native operating system or web browser. In this way, the present invention for mapping standard interfaces may apply to allow the Java developer to utilize the API interface standards to access non-Java components in the operating system.

In preferred embodiments, the mixed statement programs include Java programming language statements, which are capable of being implemented on different operating system platforms. In further embodiments, the mixed statement programs may include code from other computer languages as well as alternative cross-platform languages other than Java. In such case, the preferred embodiments provide a methodology for extending standard API interfaces to programs to allow the developer to utilize the standard API interfaces to enhance the capabilities of the program and program language being used. With preferred embodiments, the programmer may write one application program or mixed statement program including code in the cross-platform computer language and include the industry standard API interfaces, and then use implementations of the bridge to allow the program to execute on different operating system through the browser layout engine.

Preferred embodiments described the user interface as a graphical user interface, such as a web browser. However, the user interface may be in any human observable format, such as voice interface, wherein the code in the mixed statement program generates voice commands.

In non-Java implementations, a virtual machine program may be provided to translate the application program to code that is independent of the operating system platform, and then transform the operating system independent bytecodes to native operating system object code.

The bridge may be implemented in a JDK kit including the Java virtual machine. Alternatively, the bridge may be embedded into a ROM or flash memory.

Preferred embodiments described the bridge mapping W3C API interfaces to corresponding interfaces in Mozilla browsers and the Microsoft Internet Explorer 5. However, there may be further implementations of the bridge to provide API for any browser that implements aspects of the W3C DOM standard, including DOM level 1, all of the W3C HTML 4.0, and parts of the DOM level 2, including the CORE, HTML, Events, StyleSheets, and Cascading Style Sheets.

Preferred embodiments were described with respect to using the W3C API interfaces to access user interface objects, such as COM and XPCOM objects, which is the format of component objects in the Internet Explorer and Mozilla browser user interfaces, respectively. However, the bridge may map the W3C API interfaces to interfaces in any supported user interface program to access the objects in the format for that user interface. For instance, the bridge 4 may be used to interface with objects in the IBM System Object Model (SOM) format.

Mixed statement programs may be executed on any computing device that is capable of executing the bridge to transform the mixed statement code to either the native operating system code used by the computing device or the user interface APIs 12 and objects 14.

The preferred algorithm described particular steps as occurring in a particular order. However, in further embodiments the order of the steps may be changed and certain steps removed and added without departing from the scope of the invention. Moreover, different steps may be performed to execute the overall operation of the algorithm.

In summary, the present invention provides a system, method, and program for generating a user interface for an application program. A determination is made of application program interfaces (APIs) in an application program that are members of a set of standard API interfaces. The application program further includes code in a computer language to perform application program operations. A determination is made from a mapping of at least one user interface API corresponding to the determined standard API interface. The user interface APIs are capable of controlling a user interface program to perform user interface operations. The standard APIs in the application program are converted to user interface APIs to generate the user interface for the application program. The code in the computer language is converted to executable code to perform the application program operations.

The foregoing description of the preferred embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method for generating a user interface for an application program, comprising:

determining application program interfaces (APIs) in an application program that are members of a set of standard API interface in a first computer language defined in an industry standard specification, wherein the application program further includes code in a second computer language to perform application program operations;

determining from a mapping at least one user interface API in a third computer language corresponding to the determined standard API interface, wherein the user interface APIs in the third computer language are capable of being executed by a user interface program to perform user interface operations;

using the mapping to convert the standard APIs in the application program to user interface APIs in the third computer language to control the user interface program to generate the user interface for the application program; and converting the code in the second computer language to executable code to perform the application program operations.

2. The method of claim 1, wherein the third computer language and user interface program are capable of executing on multiple operating system platforms thereby allowing the application program to include standard API interfaces to execute on the multiple operating system platforms via the user interface program.

3. The method of claim 2, wherein the second computer language comprises a cross-platform object oriented computer language including Java.

4. The method of claim 1, wherein the user interface program comprises a web browser program.

5. The method of claim 1, wherein the set of standard API interfaces in the first computer language are part of the W3C Document Object Model (DOM) specification and the user interface program implements the W3C DOM.

6. The method of claim 1, wherein the converted user interface APIs in the third computer language manipulate user interface objects.

7. The method of claim 6, wherein the converted user interface APIs in the third computer language are capable of manipulating any user interface object accessible to the user interface program.

8. The method of claim 6, wherein the application program operations include operations on data and wherein the converted user interface APIs update user interface objects with the data operated upon by the application program, thereby allowing the application program to update user interface objects.

9. A system for generating a user interface for an application program, comprising:

means for determining application program interfaces (APIs) in an application program that are members of a set of standard API interfaces in a first computer language defined in an industry standard specification, wherein the application program further includes code in a second computer language to perform application program operations;

means for determining from a mapping at least one user interface API in a third computer language corresponding to the determined standard API interface, wherein the user interface APIs in the third computer language are capable of being executed by a user interface program to perform user interface operations;

means for using the mapping to convert the standard APIs in the application program to user interface APIs in the third computer language to control the user interface program to generate the user interface for the application program; and means for converting the code in the second computer language to executable code to perform the application program operations.

10. The system of claim 9, wherein the third computer language and user interface program are capable of executing on multiple operating system platforms thereby allowing the application program to include standard API interfaces to execute on the multiple operating system platforms via the user interface program.

11. The system of claim 10, wherein the third computer language comprises a cross-platform object oriented computer language including Java.

12. The system of claim 9, wherein the user interface program comprises a web browser program.

13. The system of claim 9, wherein the set of standard API interfaces in the first computer language are part of the W3C Document Object Model (DOM) specification and the user interface program implements the W3C DOM.

14. The system of claim 9, wherein the converted user interface APIs in the third computer language manipulate user interface objects.

15. The system of claim 14, wherein the converted user interface APIs in the third computer language are capable of manipulating any user interface object accessible to the user interface program.

16. The system of claim 14, wherein the application program operations include operations on data and wherein the converted user interface APIs update user interface objects with the data operated upon by the application program, thereby allowing the application program to update user interface objects.

17. An information bearing medium including code for generating a user interface for an application program, wherein the code is capable of causing a processor to perform;

determining application program interfaces (APIs) in an application program that are members of a set of standard API interfaces in a first computer language defined in an industry standard specification, wherein the application program further includes code in a second computer language to perform application program operations;

determining from a mapping at least one user interface API in a third computer language corresponding to the determined standard API interface, wherein the user interface APIs in the third computer language in are capable of being executed by a user interface program to perform user interface operations;

using the mapping to convert the standard APIs in the application program to user interface APIs in the third computer language to control the user interface program to generate the user interfere for the application program; and converting the code in the second computer language to executable code to perform the application program operations.

18. The information bearing medium of claim 17, wherein the third computer language and user interface program are capable of executing on multiple operating system platforms thereby allowing the application program to include standard API interfaces to execute on the multiple operating system platforms via the user interface program.

19. The information bearing medium of claim 18, wherein the third computer language comprises a cross-platform object oriented computer language including Java.

20. The information bearing medium of claim 17, wherein the user interface program comprises a web browser program.

21. The information bearing medium of claim 17, wherein the set of standard API interfaces in the first computer language are part of the W3C Document Object Model (DOM) specification and the user interface program implements the W3C DOM.

22. The information bearing medium of claim 17, wherein the converted user interface APIs in the third computer language manipulate user interface objects.

23. The information bearing medium of claim 22, wherein the converted user interface APIs in the third computer language are capable of manipulating any user interface object accessible to the user interface program.

24. The information bearing medium of claim 22, wherein the application program operations include operations on data and wherein the converted user interface APIs update user interface objects with the data operated upon by the application program, thereby allowing the application program to update user interface objects.

* * * * *